United States Patent [19]

Hildebrecht

[11] 4,237,752

[45] Dec. 9, 1980

[54] APPARATUS FOR CONTROLLING A PLURALITY OF MECHANISMS

[75] Inventor: Harold V. Hildebrecht, Cleveland, Ohio

[73] Assignee: Towmotor Corporation, Mentor, Ohio

[21] Appl. No.: 949,322

[22] Filed: Oct. 6, 1978

[51] Int. Cl.³ .................. G05G 1/14; G05G 9/02; F16H 57/06

[52] U.S. Cl. .................. 74/878; 74/474; 74/478; 74/513; 74/850

[58] Field of Search ........... 74/474, 478, 512, 513, 74/850, 878; 192/0.098

[56] References Cited

U.S. PATENT DOCUMENTS

| | | | |
|---|---|---|---|
| 2,493,592 | 1/1950 | Peabody | 74/878 |
| 3,359,821 | 12/1967 | Beardsley et al. | 74/478 X |
| 3,608,399 | 9/1971 | Knight | 74/850 |
| 3,613,482 | 10/1971 | Benson, Jr. | 192/0.098 |
| 3,630,326 | 12/1971 | Kawaguchi | 74/478 |
| 3,845,674 | 11/1974 | Hause | 74/878 |

*Primary Examiner*—Allan D. Herrmann
*Attorney, Agent, or Firm*—Phillips, Moore, Weissenberger, Lempio & Majestic

[57] ABSTRACT

Apparatus (10) for controlling a plurality (12, 16) of mechanisms, including a pedal (20), a first device (44) for permitting the pedal (20) to move in a substantially straight line to regulate a first mechanism (12), and a second device (24, 58, 60), for permitting the pedal (20) to pivot to regulate a second mechanism (16). In a specific embodiment, the pedal (20) is moved substantially linearly to shift a vehicle transmission control valve (12) into forward, reverse, or neutral positions, whereas the pedal (20) is pivoted to increase engine speed. The second device (24, 58, 60) also prevents linear movement of the pedal (20) when the pedal (20) has been pivoted to preselected amount.

14 Claims, 2 Drawing Figures

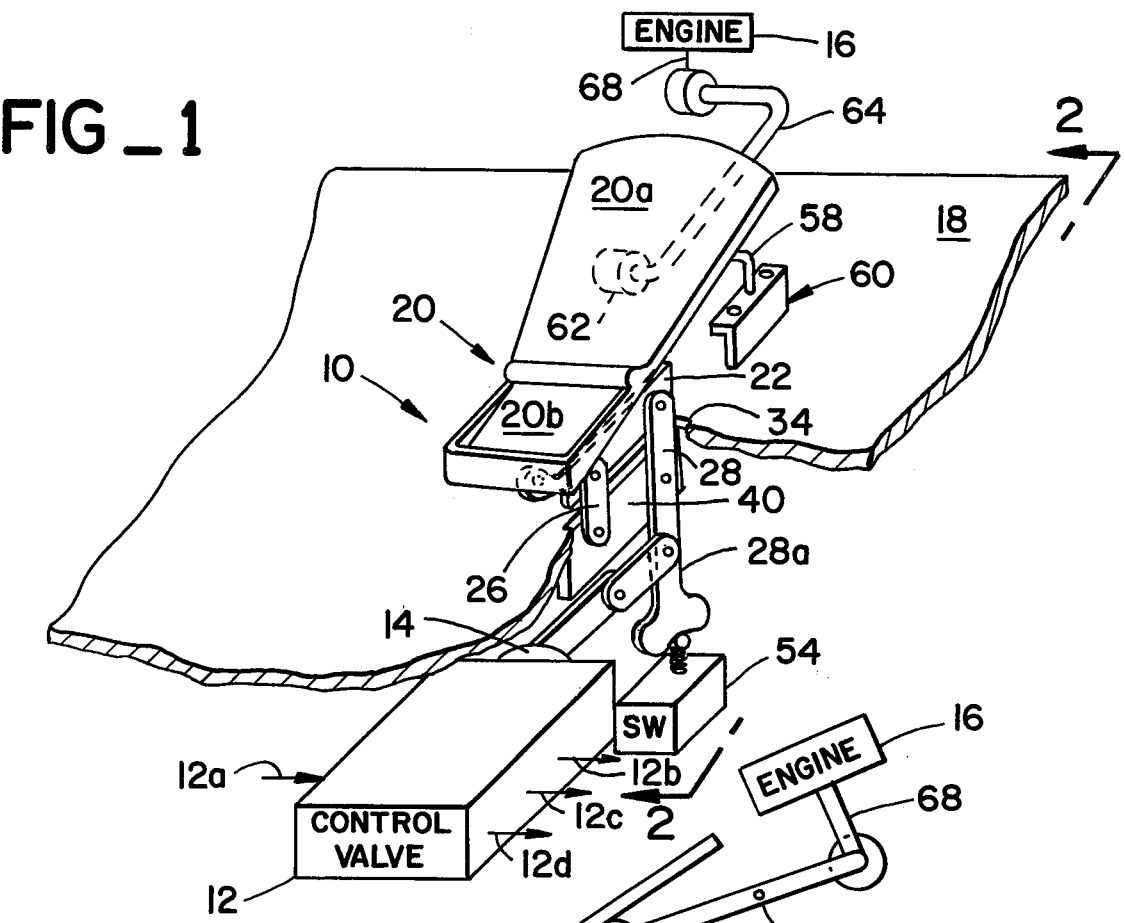
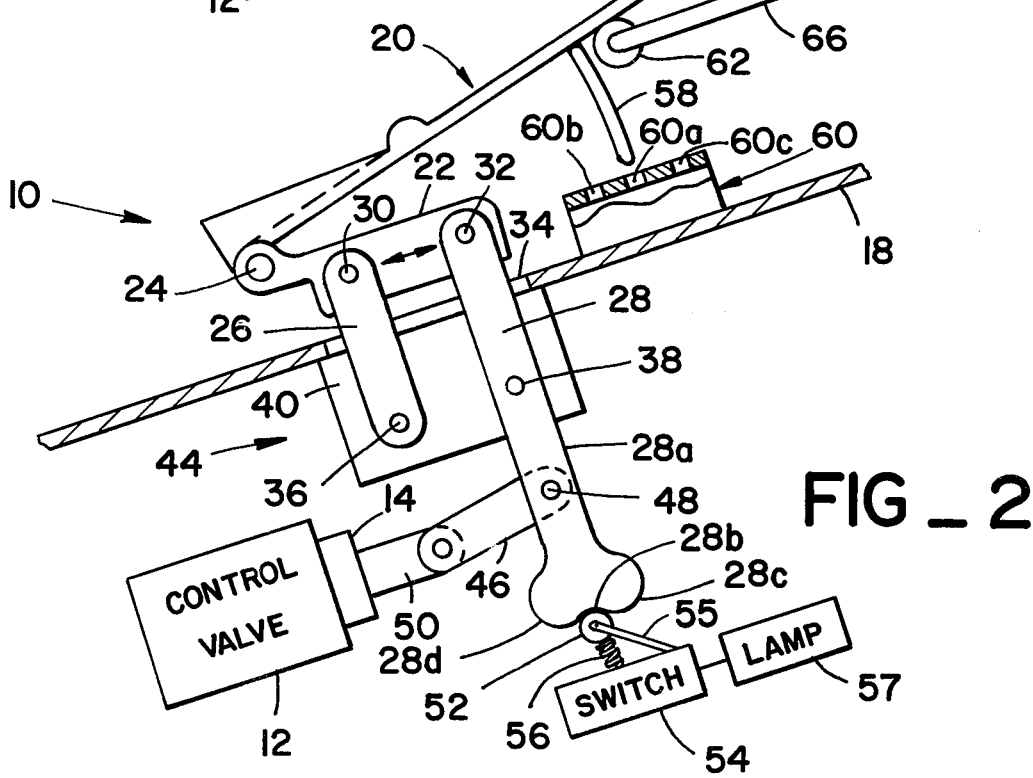

APPARATUS FOR CONTROLLING A PLURALITY OF MECHANISMS

TECHNICAL FIELD

This invention relates to apparatus for controlling a plurality of mechanisms.

BACKGROUND ART

As is well-known, systems, such as mechanical, hydraulic, or electrical systems, are utilized to perform a variety of functions. Each system typically includes an assemblage of objects or devices united by some form of regular interaction or interdependence to provide a specified function. For example, this assemblage may constitute a plurality of mechanisms, each of which may have to be controlled in an orderly manner for the system to operate as desired.

Controls, either manual or automatic, are normally employed to actuate the mechanisms. While a system may include a single control for actuating a plurality of mechanisms, it is not unusual that one motion of the control, such as a rotary motion, is used to actuate these mechanisms. This may not be entirely satisfactory to ensure independent actuation of each mechanism should that be needed for the system. Moreover, if the control is manually operable, and is required to be operated often over a period of time, then it also may be important that the control be able to be manipulated relatively easily, smoothly and comfortably to reduce the likelihood of operator fatigue.

As one example of a system, consideration may be given to vehicles such as fork lift trucks which are in wide use for handling and moving articles between various locations. In the operation of these vehicles, it is often required that the vehicle be simultaneously steered and driven, and that the fork lift be simultaneously actuated to pick up and deliver articles from one station to another. Consequently, during the course of the operation of a fork lift truck, the operator will be busy manipulating various controls to perform these functions.

Generally, it has been found useful to enable the operator to accomplish such functions by making use of the operator's feet and hands. For example, mechanisms governing the direction of the truck via the transmission, and engine speed, can be regulated with a pedal control which can be rotated or pivoted by the operator's feet, thereby freeing the operator's hands for manipulating other controls for the steering of the vehicle and the activation of a fork lift mechanism. This single rotary motion of the pedal control however, may not adequately enable the vehicle operator to independently regulate the direction and speed. Also, since the operator can be stationed on the truck for an extended period of time and may have to constantly actuate the controls for performing such functions, it is not unlikely that the operator may become fatigued. However, the prior controls such as the pedal control have not been designed necessarily to make their manipulation relatively easy, smooth and comfortable so as to reduce the likelihood of fatigue.

DISCLOSURE OF THE INVENTION

The present invention is directed to overcoming one or more of the problems as set forth above.

In accordance with the present invention, there is provided an apparatus for controlling a plurality of mechanisms, comprising a pedal, first means for permitting said pedal to move in a substantially straight line to regulate a first mechanism, and second means for permitting said pedal to pivot to regulate a second mechanism.

The problems of the prior art relating to adequate independent regulation of a plurality of mechanisms and operator fatigue are solved by the present invention with the above two respective means for permitting straight line and pivotal movement of the pedal. The advantages of the invention are that these two different movements enable an operator to know exactly which mechanisms are being regulated, and that these movements make for easy, comfortable and smooth pedal operation.

BRIEF DESCRIPTION OF THE DRAWINGS

FIG. 1 is a view in perspective of an embodiment of the apparatus of the invention.

FIG. 2 is a side elevation looking in the direction of the arrows on lines 2—2 of FIG. 1.

BEST MODE FOR CARRYING OUT THE INVENTION

While the invention has applicability to systems in general, particular reference will be made to one specific system for an understanding of the invention.

With respect to FIGS. 1 and 2 there is shown an apparatus 10 for controlling a mechanism such as a transmission control valve 12 which can be used, for example, in a torque converter transmission (not shown) of a type well known in the art for a vehicle such as a fork lift truck. The control valve 12 has a spool 14 which is movable or shiftable through various positions corresponding to various drive modes including forward, reverse and neutral. Control valves such as the valve 12 are well known in the art and function to direct hydraulic fluid at its input 12a to a plurality of outputs 12b, 12c and 12d depending on the position of the spool 14 to place the transmission in forward or reverse drive or neutral, respectively. The apparatus 10 also is used to control another mechanism such as the vehicle engine shown generally at 16, particularly the engine speed, when the transmission is in forward, reverse or neutral.

The apparatus 10 is mounted on the inclined floor 18 of the vehicle and has a pedal 20 which includes a forward plate 20a and a rearward plate 20b that receive, respectively, the ball and heel of the vehicle operator's foot. An upper, movable link 22, above the floor 18, is pivotally coupled at one end by a pivot 24 to the rearward plate 20b. A pair of depending links 26 and 28 are pivotally coupled, respectively, by pivots 30 and 32 to the link 22. Links 26 and 28 extend downwardly from the link 22 through an elongated slot 34 in the floor 18 where they are pivotally coupled by pivots 36 and 38, respectively, to a fixed block or lower link 40 extending beneath the floor 18.

The links 22, 26 and 28, together with the fixed link 40 constitute a 4-bar linkage 44 which permits or controls the pedal 20 to travel in a substantially straight line, parallel to the floor 18, back and forth in the directions shown by the double headed arrow in FIG. 2. When, for example, the vehicle operator pushes on the pedal 20, with his heel, to the right as viewed in FIG. 2, the link 22 will move to the right substantially parallel to the floor 18, with the links 26 and 28 rotating clockwise in a very small arc about the fixed link 40. When the vehicle operator pushes on the pedal 20 with his heel, to the left as viewed in FIG. 2, the link 22 will move to the left substantially parallel to the floor 18, with the links 26 and 28 rotating counterclockwise in a very small arc about the pivots 36 and 38 and the fixed line 40. By making the length of the links 26 and 28 suitably long and by making the maximum travel distance of the pedal 20 suitably small to perform its functions to be described, the link 22 and with it the pedal 20 will travel in the substantially straight line.

Link 28 extends downwardly from the pivot 38 with an extension 28a which is pivotally connected to one end of a link 46 by a pin 48, the link 46 thereby moving with the link 28a. The other end of link 46 is connected to the spool 14 by a pivotally coupled connecting rod 50 to move the spool 14 in response to movement of the extension 28a.

The position of the spool 14 shown in FIG. 2 can correspond to a position of neutral for the control valve 12. When the link 28 is rotated clockwise from this neutral position, the extension 28a also will rotate clockwise. Thus, the pin 48 will move to the left and cause the link 46 and connecting rod 50 to shift the spool 14 inwardly of the valve 12. This will, for example, place the valve 12 in a position for forward drive. When the link 28 is rotated counterclockwise from the position shown, the extension 28a also will be rotated counterclockwise to move the pin 48 to the right and cause the link 46 and rod 50 to move the spool 14 outwardly from the valve 12, thereby placing the valve in a position of reverse drive.

The link extension 28a has at its lower end a cam surface or groove 28b in which there sits a cam follower 52 that is pivotally coupled to yet another mechanism such as a microswitch 54 by a rod 55. A spring 56 biases the cam follower 52 into the groove 28b. The switch 54 is coupled within the electrical system (not shown) of the vehicle so that when it is closed the engine 16 can be started while when it is open the engine 16 can not be started. In the neutral position shown in FIG. 2, the spring 56 biases the cam follower 52 into the groove 28b and also closes the switch 54. Consequently, in this neutral position of the vehicle transmission, the engine 16 can be started. When the link 28 is rotated clockwise or counterclockwise to place the control valve 12 and hence the transmission into forward or reverse drive, the cam follower 52 will roll out of the groove 28b onto a projection 28c or 28d of the extension 28a to compress the spring 56 and force the switch 54 to open. Consequently, if the transmission is in either forward or reverse drive, this will prevent initial start-up of the engine 16. The microswitch 54 can also be coupled within a circuit (not shown) that will provide a signal, such as by lighting a lamp 57 when the switch 54 is closed, to inform the vehicle operator that the transmission is in neutral and the engine can be started.

A projection 58 extends downwardly from the underside of the plate 20a of pedal 20 and is in an operative relationship with respect to an inverted L-shaped index 60 which is fixed to the floor 18. The index 60 has three spaced openings 60a, 60b and 60c through which the projection 58 can travel. When the pedal 20 is moved substantially linearly to place the projection 58 over the opening 60a, the link 28 will be in a position to place the valve 12 in a position corresponding to neutral. When the pedal 20 is moved substantially linearly to place the projection over the openings 60b or 60c, the link 28 will have been moved to place the valve 12 in a position of either forward or reverse drive, respectively.

When the projection 58 is over any one of the openings 60a, 60b or 60c, the pedal 20 can be depressed or rotated about the pivot 24 to move the projection 58 downwardly through these openings. A roller 62 is coupled to the underside of the plate 20a to roll upwardly along this underside as the plate 20a is depressed. A lever 64 is pivotally connected by a pivot 66 to a suitable support (not shown) to rotate in a counterclockwise direction about the pivot 66 as the roller 62 rolls up the plate 20a. The lever 64 is coupled to a link shown generally at 68 which responds to this rotational movement of the lever 64 to control a throttle (not shown) of the engine 16 and hence the speed of the engine.

Industrial Applicability

The apparatus 10 can be manipulated in the following manner to control the direction of movement of the vehicle and the speed of the engine 16. With the apparatus 10 in the position shown, the control valve 12 will be in a position of neutral and the switch 54 will be closed so that the engine 16 can be started. If the operator desires to accelerate the engine 16 while in neutral, he need merely depress the plate 20a which will move the projection 58 through the opening 60a. The roller 62 will thereby roll along the underside of the plate 20a to cause acceleration of the engine 16. Of course, the pedal 20 can be spring-biased in any conventional manner to return the plate 20a to the position shown in FIG. 2 for decelerating the engine 16 when the operator releases his foot from the plate 20a with the pedal 20 in the position shown in FIG. 2.

To place the vehicle in forward or reverse drive, the operator will push on the pedal 20 as already described to move the link 22 parallel to the floor 18. When in either forward or reverse drive, the operator can then depress the plate 20a to move the projection 58 through the respective opening 60b or 60c to increase the speed of the engine 16 while in forward or reverse drive.

When the pedal 20 is in the position illustrated in FIG. 2, or when it is moved to place the control valve 12 in a position of forward or reverse drive, without the plate 20a being depressed, the projection 58 will be slightly above the index 60. In this position of the projection 58, the roller 62 and the linkage 64 and 68 can be set so that the engine 16 is in an idle condition. In this idle condition, the transmission can be shifted between neutral, forward and reverse drive by moving the link 22 as already described. However, if the engine speed is being increased in any drive mode, whereby the projection 58 will extend through one of the openings 60a, 60b or 60c, this will prevent the link 22 from being moved in its relatively straight line path. Consequently, the operator is prevented from inadvertently shifting the transmission from, for example, forward to reverse drive or vice versa when the engine 16 is at a speed greater than idle speed.

With the apparatus 10, the vehicle operator need not remove his foot from the pedal 20 to shift the transmission between forward, reverse or neutral, or to change the engine speed. Also, the pedal 20 need only be moved in a substantially straight line to shift the transmission. All of this will make it relatively easy, smooth and comfortable for the operator to control the direction of movement of the vehicle and the speed of the engine 16. Furthermore, because of this substantially straight line movement of the pedal 20, the vehicle can be easily and rapidly shifted between forward and reverse drive should the vehicle have to be used for a shuttle-type operation.

Other aspects, objects and advantages of this invention can be obtained from a study of the drawings, the disclosure and the appended claims.

What is claimed is:

1. Apparatus (10) for controlling a plurality (12, 16) of mechanisms, comprising:
   (a) a pedal (20);
   (b) first means (44, 46) for controlling said pedal (20) to move in a substantially straight line to regulate a first mechanism (12); and
   (c) second means (24, 58, 60) for controlling said pedal (20) to pivot to regulate a second mechanism (16), said second means including means (58, 60) for preventing said pedal (20) from moving in a substantially straight line when said pedal (20) is pivoted a preselected amount to regulate the second mechanism (16).

2. Apparatus (10) according to claim 1 wherein said means (58, 60) for preventing includes:
   (a) a projection (58) connected to said pedal (20); and
   (b) index means (60) for receiving said projection (58).

3. Apparatus (10) according to claim 2 wherein said index means (60) includes an opening (60a) and wherein said second means (24, 58, 60) for controlling includes a pivot (24) connecting said pedal (20) to said first means (44, 46) for controlling, said projection (58) moving into said opening (60a) in response to the pivoting of said pedal (20).

4. Apparatus (10) according to claim 1 further including means (28a) for regulating a third mechanism (54) in response to movement of said pedal (20) in a substantially straight line.

5. Apparatus (10) for controlling a plurality (12, 16) of mechanisms, comprising:
   (a) a pedal (20)
   (b) first means (44, 46) for controlling said pedal (20) to move in a substantially straight line to regulate a first mechanism (12), said first means including a linkage (44) having an upper link (22), a lower link (40), and a pair (26, 28) of links being pivotally connected between said upper link (22) and said lower link (40), said linkage (44) being connected to said pedal (20); and
   (c) second means (24, 58, 60) for controlling said pedal (20) to pivot to regulate a second mechanism (16).

6. Apparatus (10) according to claim 5 wherein said pedal (20) is connected to said upper link (22).

7. Apparatus (10) according to claim 6 wherein said pedal (20) is pivotally connected to said upper link (22).

8. Apparatus (10) for controlling a transmission control valve (12) of a vehicle having an engine (16), comprising:
   (a) a pedal (20);
   (b) first means (44) for controlling said pedal (20) to move to a plurality of positions in a substantially straight line;
   (c) means (28a, 46, 48) for shifting the control valve (12) between a plurality of drive modes in response to the linear position of said pedal (20); and
   (d) second means (24, 58, 60) for controlling said pedal (20) to pivot to regulate the speed of the engine (16) and for preventing the straight line movement of said pedal (20) when said pedal (20) is pivoted a preselected amount.

9. Apparatus (10) according to claim 8 wherein said first controlling means (44) includes a linkage (22, 26, 28, 40).

10. Apparatus (10) according to claim 9 wherein said linkage (22, 26, 28, 40) includes a movable link (22), said pedal (20) being connected to said movable link.

11. Apparatus (10) according to claim 10 wherein said second means (24, 58, 60) for controlling includes a pivot (24) connecting said pedal (20) to said movable link (22).

12. Apparatus (10) according to claim 8 wherein said second means (24, 58, 60) for controlling includes:
   (a) an index (60) positioned in proximity to said pedal (20) and having a plurality of apertures (60a, 60b, 60c), each corresponding to one of the drive modes; and
   (b) a projection (58) extending from said pedal (20) towards said index (60), said pedal (20) being pivotally supported by said first means (44) for controlling and said index (60) receiving said projection (58) in any one of said apertures (60a, 60b, 60c) in response to the pivoting of said pedal (20).

13. Apparatus (10) according to claim 8 further including means (28a, 52, 54, 56) for preventing engine start-up in response to said pedal (20) being in any position other than a position corresponding to a drive mode of neutral.

14. Apparatus (10) according to claim 13 wherein said engine start-up preventing means (28a, 52, 54, 56) includes means (56) for providing a signal in response to said pedal (20) being in the position corresponding to neutral.

* * * * *